US012756506B2

(12) United States Patent
Yin et al.

(10) Patent No.: US 12,756,506 B2
(45) Date of Patent: Oct. 6, 2026

(54) METHODS OF COLLISION RESOLUTION BETWEEN MULTIPLE HIGH PRIORITY PUCCHs WITH HARQ-ACK AND A LOW PRIORITY PUSCH

(71) Applicant: SHARP KABUSHIKI KAISHA, Sakai City (JP)

(72) Inventors: Zhanping Yin, Vancouver, WA (US); Kai Ying, Vancouver, WA (US); Kazunari Yokomakura, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 330 days.

(21) Appl. No.: 18/704,871

(22) PCT Filed: Oct. 12, 2022

(86) PCT No.: PCT/JP2022/037969

§ 371 (c)(1),
(2) Date: Apr. 25, 2024

(87) PCT Pub. No.: WO2023/079916

PCT Pub. Date: May 11, 2023

(65) Prior Publication Data

US 2025/0260520 A1 Aug. 14, 2025

Related U.S. Application Data

(60) Provisional application No. 63/275,830, filed on Nov. 4, 2021.

(51) Int. Cl.
*H04L 1/1829* (2023.01)

(52) U.S. Cl.
CPC .......... *H04L 1/1854* (2013.01); *H04L 1/1861* (2013.01)

(58) Field of Classification Search
CPC .... H04L 1/1854; H04L 1/1861; H04L 1/1664
See application file for complete search history.

(56) References Cited

U.S. PATENT DOCUMENTS

| | | | | |
|---|---|---|---|---|
| 2020/0178252 | A1* | 6/2020 | Li | H04W 72/04 |
| 2021/0410155 | A1* | 12/2021 | Khoshnevisan | H04L 1/1896 |
| 2023/0292320 | A1* | 9/2023 | Yang | H04L 1/1854 |
| 2023/0354313 | A1* | 11/2023 | Yin | H04L 1/1861 |
| 2023/0379962 | A1* | 11/2023 | Andersson | H04W 72/02 |

(Continued)

*Primary Examiner* — Julio R Perez
(74) *Attorney, Agent, or Firm* — ScienBiziP, P.C.

(57) ABSTRACT

A user equipment (UE) is described. The UE includes circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). When only one HP PUCCH with HP HARQ-ACK overlaps with a LP PUSCH, multiplex the HP HARQ-ACK on the LP PUSCH starting from an orthogonal frequency-division multiplexing (OFDM) symbol that is available after a first consecutive demodulation reference signal (DM-RS) OFDM symbol. When more than one HP PUCCH with HP HARQ-ACK overlaps with a LP PUSCH, for each overlapping HP PUCCH carrying the HP HARQ-ACK, multiplex a corresponding HP HARQ-ACK on confined symbols of the LP PUSCH.

2 Claims, 13 Drawing Sheets

(56) References Cited

U.S. PATENT DOCUMENTS

| | | | | |
|---|---|---|---|---|
| 2023/0413272 | A1* | 12/2023 | Fu | H04W 76/20 |
| 2024/0146467 | A1* | 5/2024 | Yin | H04L 1/1854 |
| 2024/0348379 | A1* | 10/2024 | Yin | H04W 72/12 |
| 2025/0089085 | A1* | 3/2025 | Yin | H04L 1/1864 |
| 2025/0260520 | A1* | 8/2025 | Yin | H04L 1/1854 |

* cited by examiner

METHODS OF COLLISION RESOLUTION BETWEEN MULTIPLE HIGH PRIORITY PUCCHs WITH HARQ-ACK AND A LOW PRIORITY PUSCH

TECHNICAL FIELD

The present disclosure relates generally to communication systems. More specifically, the present disclosure relates to methods of collision resolution between multiple high priority physical uplink control channels (PUCCHs) with hybrid automatic repeat request-acks (HARQ-ACKs) and a low priority physical uplink shared channel (PUSCH).

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: circuitry configured to: determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP); when overlapping with only one HP PUCCH with HP HARQ-ACK is known before an LP PUSCH transmission, multiplex a first HP HARQ-ACK from a first overlapping HP PUCCH on the LP PUSCH and transmit later overlapping HP PUCCH(s) carrying the HP HARQ-ACK by partially dropping the LP PUSCH with the first HP HARQ-ACK perform channel dropping for later overlapping HP PUCCH with HP HARQ-ACK; and when overlapping with more than one HP PUCCH with HP HARQ-ACK is known before an LP PUSCH transmission, cancel the LP PUSCH and transmit HP PUCCHs with HP HARQ-ACKs.

In one example, a base station (gNB), comprising: circuitry configured to: determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP); receive the LP PUSCH, when overlapping with only one HP PUCCH with HP HARQ-ACK is known before an LP PUSCH transmission, a first HP HARQ-ACK from a first overlapping HP PUCCH is multiplexed on the LP PUSCH for later overlapping HP PUCCH with HP HARQ-ACK, and transmit later overlapping HP PUCCH(s) carrying the HP HARQ-ACK by partially dropping the LP PUSCH with the first HP HARQ-ACK, and receive HP PUCCHs with HP HARQ-ACKs with the LP PUSCH canceled when overlapping with more than one HP PUCCH with HP HARQ-ACK is known before an LP PUSCH transmission.

DESCRIPTION OF EMBODIMENTS

Figure 1:
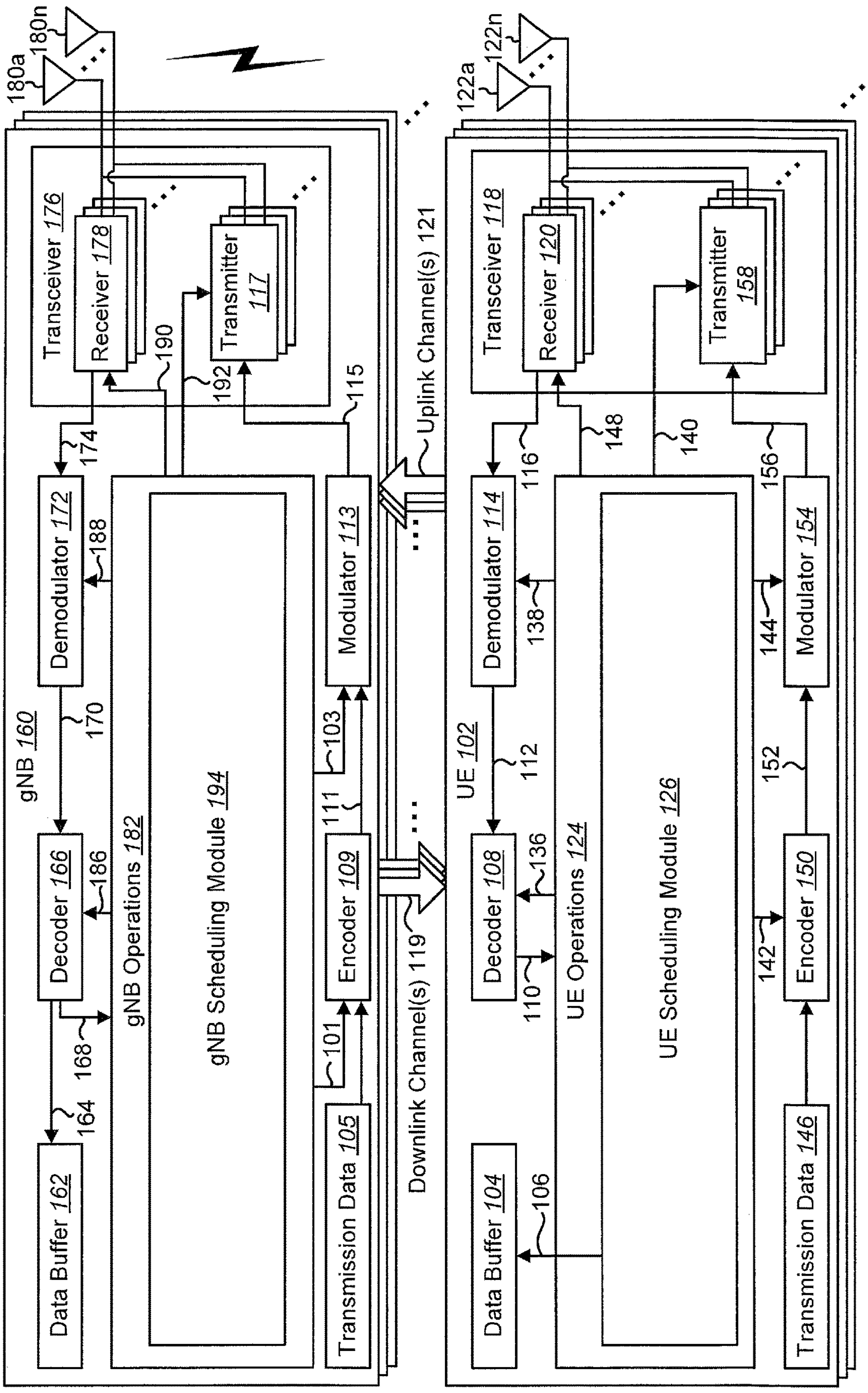
FIG. 1 is a block diagram illustrating one implementation of one or more gNBs and one or more UEs in which systems and methods for collision resolution may be implemented.

A user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to, when only one HP PUCCH with HP HARQ-ACK overlaps with a LP PUSCH, multiplex the HP HARQ-ACK on the LP PUSCH starting from an orthogonal frequency-division multiplexing (OFDM) symbol that is available after a first consecutive demodulation reference signal (DM-RS) OFDM symbol. The circuitry may also, when more than one HP PUCCH with HP HARQ-ACK overlaps with a LP PUSCH, for each overlapping HP PUCCH carrying the HP HARQ-ACK, multiplex a corresponding HP HARQ-ACK on confined symbols of the LP PUSCH.

A base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the LP PUSCH, wherein when only one HP PUCCH with HP HARQ-ACK overlaps with a LP PUSCH, the HP HARQ-ACK is multiplexed starting from an orthogonal frequency-division multiplexing (OFDM) symbol that is available after a first consecutive demodulation reference signal (DM-RS) OFDM symbol, and wherein when more than one HP PUCCH with HP HARQ-ACK overlaps with a LP PUSCH, for each overlapping HP PUCCH carrying the HP HARQ-ACK, a corresponding HP HARQ-ACK is multiplexed on confined symbols of the LP PUSCH.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to multiplex the first HP HARQ-ACK of a first overlapping HP PUCCH on the LP PUSCH. The circuitry may also be configured to transmit later overlapping HP PUCCH(s) carrying the HP HARQ-ACK by partially dropping the LP PUSCH with the first HP HARQ-ACK.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the LP PUSCH, wherein the HP HARQ-ACK of a first overlapping HP PUCCH was multiplexed on the LP PUSCH. The circuitry may also be configured to receive the later overlapping HP PUCCH(s) carrying the HP HARQ-ACK and the partially dropped LP PUSCH with the first HP HARQ-ACK.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to concatenate, jointly code and multiplex the HP HARQ-ACKs of HP PUCCHs satisfying an uplink control information (UCI) multiplexing timeline on the LP PUSCH.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the LP PUSCH, wherein the HP HARQ-ACKs of HP PUCCHs satisfying an uplink control information (UCI) multiplexing timeline are concatenated, jointly coded and multiplexed on the LP PUSCH.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to, when overlapping with only one HP PUCCH with HP HARQ-ACK is known before an LP PUSCH transmission, multiplex a first HP HARQ-ACK from a first overlapping HP PUCCH on the LP PUSCH and transmit later overlapping HP PUCCH(s) carrying the HP HARQ-ACK by partially dropping the LP PUSCH with the first HP HARQ-ACK perform channel dropping for later overlapping HP PUCCH with HP HARQ-ACK. The circuitry may also be configured to, when overlapping with more than one HP PUCCH with HP HARQ-ACK is known before an LP PUSCH transmission, cancel the LP PUSCH and transmit HP PUCCHs with HP HARQ-ACKs.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the LP PUSCH, when overlapping with only one HP PUCCH with HP HARQ-ACK is known before an LP PUSCH transmission, a first HP HARQ-ACK from a first overlapping HP PUCCH is multiplexed on the LP PUSCH for later overlapping HP PUCCH with HP HARQ-ACK, and transmit later overlapping HP PUCCH(s) carrying the HP HARQ-ACK by partially dropping the LP PUSCH with the first HP HARQ-ACK. The circuitry may also be configured to receive HP PUCCHs with HP HARQ-ACKs with the LP PUSCH canceled when overlapping with more than one HP PUCCH with HP HARQ-ACK is known before an LP PUSCH transmission.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to multiplex HP HARQ-ACK symbols no later than an ending symbol of the HP PUCCH.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the HP PUCCH, wherein HP HARQ-ACK symbols are multiplexed no later than an ending symbol of the HP PUCCH.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to multiplex HP HARQ-ACK symbols no later than an ending symbol of a subslot comprising the HP PUCCH.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the HP PUCCH, wherein HP HARQ-ACK symbols are multiplexed no later than an ending symbol of a subslot comprising the HP PUCCH.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to multiplex HP HARQ-ACK symbols no later than a threshold of n symbols after an ending symbol of the HP PUCCH or after an ending symbol of a subslot comprising the HP PUCCH.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the HP PUCCH, wherein HP HARQ-ACK symbols are multiplexed no later than a threshold of n symbols after an ending symbol of the HP PUCCH or after an ending symbol of a subslot comprising the HP PUCCH.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to define a HARQ-ACK delay limit as a number of subslots from an original HP PUCCH.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the HP PUCCH, wherein a HARQ-ACK delay limit is defined as a number of subslots from an original HP PUCCH.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to, when the HP HARQ-ACK(s) from overlapping HP PUCCH(s) are multiplexed on the LP PUSCH, for overlapping with another HP PUCCH with HP HARQ-ACK, cancel the LP PUSCH no later than a starting symbol of a next HP PUCCH with HP HARQ-ACK and no earlier than a symbol after a first HARQ-ACK multiplexed symbol on LP PUSCH.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the HP PUCCH, wherein when the HP HARQ-ACK(s) from overlapping HP PUCCH(s) are multiplexed on the LP PUSCH, for overlapping with another HP PUCCH with HP HARQ-ACK, the LP PUSCH were canceled no later than a starting symbol of a next HP PUCCH with HP HARQ-ACK and no earlier than a symbol after a first HARQ-ACK multiplexed symbol on LP PUSCH.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The HP HARQ-ACK multiplexed on the LP PUSCH may include the HP HARQ-ACK from the first overlapping HP PUCCH with HARQ-ACK with the LP PUSCH.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the HP PUCCH, wherein the HP HARQ-ACK multiplexed on the LP PUSCH comprises the HP HARQ-ACK from the first overlapping HP PUCCH with HARQ-ACK with the LP PUSCH.

Another user equipment (UE) is described. The UE may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The HP HARQ-ACK multiplexed on the LP PUSCH may include a joint HP HARQ-ACK from all overlapping HP PUCCH with HARQ-ACK satisfying a multiplexing timeline and delay restriction.

Another base station (gNB) is described. The gNB may include circuitry configured to determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP). The circuitry may also be configured to receive the HP PUCCH, wherein the HP HARQ-ACK multiplexed on the LP PUSCH comprises a joint HP HARQ-ACK from all overlapping HP PUCCH with HARQ-ACK satisfying a multiplexing timeline and delay restriction.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and/or other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In de-scribing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink (DL) resources and the carrier frequency of the uplink (UL) resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells for which the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In some approaches, uplink control information (UCI) multiplexing on PUSCH may be supported only for UCI and a PUSCH with the same priority. If there is an overlap between a PUCCH and PUSCH with different priorities, the high priority (HP) channel may be transmitted, and the low priority (LP) channel may be dropped.

In some approaches, HARQ-ACK multiplexing on PUSCH of a different priority may be supported. In some examples, a PUCCH may be configured with a subslot structure, while no subslot may be configured for PUSCH. The PUSCH allocation may be flexible in a slot with different starting symbols and durations. Accordingly, multiple HP PUCCHs for HP HARQ-ACK may overlap with a HP PUSCH or a LP PUSCH in some scenarios.

There is a need to establish approaches for single HP HARQ-ACK multiplexing and/or for handling multiple HP HARQ-ACK overlap with a PUSCH.

The techniques below describe the case of overlapping between multiple HP PUCCH for HP HARQ-ACK with a LP PUSCH. This may be a more common use case since the HP PUCCH may be configured with a subslot structure, and HP and LP traffics are scheduled separately.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for collision resolution may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH"

may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-Acknowledgement (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented. In some examples, one or more of the components (e.g., the UE operations module 124) of the UE 102 may be implemented in hardware, a combination of hardware and instructions, one or more circuitries, and/or one or more processors. For instance, one or more of the components of the UE 102 may be included in one or more circuitries, one or more modems, one or more RF front ends, and/or one or more processors, etc.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform collision resolution and/or collision avoidance as described herein. For instance, the UE 102, the UE operations module 124, and/or the UE scheduling module 126 may perform one or more of the operations, functions, approaches, and/or examples described herein.

Some examples of the techniques described herein may provide approaches for collision resolution between multiple high priority HARQ-ACKs and a high priority PUSCH. A high priority UCI may be a high priority HARQ-ACK or a high priority SR. A high priority HARQ-ACK corresponds to a high priority PDSCH transmission. A PDSCH may be dynamically scheduled by downlink control information (DCI) or configured by semi-persistent scheduling (SPS). The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, high priority HARQ-ACK, or high priority PUCCH resource may be configured to support URLLC services. The high priority may be configured with a priority index 1. Thus, a high priority PDSCH/PUSCH may be a PDSCH/PUSCH with priority index 1, a high priority HARQ-ACK may be a HARQ-ACK with priority index 1 corresponding to a PDSCH with priority index 1. A PUCCH resource with priority index 1 may be used to report UCI with priority index 1.

A low priority UCI may be a low priority HARQ-ACK or a low priority SR, or a CSI report, etc. A low priority HARQ-ACK corresponds to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, low priority HARQ-ACK, or low priority PUCCH resource may be configured to support eMBB services. The low priority may be configured with a priority index 0. Thus, a low priority PDSCH/PUSCH may be a PDSCH/PUSCH with priority index 0. A low priority HARQ-ACK may be a HARQ-ACK with priority index 0 corresponding to a PDSCH with priority index 0. A PUCCH resource with priority index 0 may be used to report UCI with priority index 0. As used herein, the term “low priority” may mean a priority that is lower than “high priority.” For instance, “high priority” information may take precedence over “low priority” information, or a “high priority” channel may take precedence over a “low priority” channel.

For HARQ-ACK priorities, if a UE 102 is provided a pdsch-HARQ-ACK-Codebook-List, the UE 102 can be indicated by the pdsch-HARQ-ACK-Codebook-List to generate one or two HARQ-ACK codebooks. If the UE 102 is indicated to generate two HARQ-ACK codebooks, a first HARQ-ACK codebook may be associated with a PUCCH of priority index 0 and a second HARQ-ACK codebook may be associated with a PUCCH of priority index 1.

For SR priorities, a UE 102 may be configured, by SchedulingRequestResourceConfig, a set of configurations for SR in a PUCCH transmission using either PUCCH format 0 or PUCCH format 1. A UE 102 may be configured, by schedulingRequestIDForBFR, a configuration for a link recovery request (LRR) in a PUCCH transmission using either PUCCH format 0 or PUCCH format 1. The UE 102 can be configured, by schedulingRequestPriority in SchedulingRequestResourceConfig, a priority index 0 or a priority index 1 for the SR.

A PUSCH or a PUCCH, including repetitions if any, may be of priority index 0 or of priority index 1. If a priority index is not provided for a PUSCH or a PUCCH, the priority index may be 0. If in an active DL BWP a UE 102 monitors PDCCH either for detection of DCI format 0_1 and DCI format 1_1 or for detection of DCI format 0_2 and DCI format 1_2, a priority index may be provided by a priority indicator field. If a UE 102 indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 may schedule a PUSCH transmission of any priority and a DCI format 1_1 or a DCI format 1_2 may schedule a PDSCH reception and trigger a PUCCH transmission with corresponding HARQ-ACK information of any priority. If, after resolving overlapping for PUCCH and/or PUSCH transmissions of a same priority index, a UE 102 determines to transmit:

- a first PUCCH of larger priority index, a PUSCH or a second PUCCH of smaller priority index, and a transmission of the first PUCCH would overlap in time with a transmission of the PUSCH or the second PUCCH, the UE 102 may not transmit the PUSCH or the second PUCCH;
- a PUSCH of larger priority index, a PUCCH of smaller priority index, and a transmission of the PUSCH would overlap in time with a transmission of the PUCCH, the UE 102 may not transmit the PUCCH; or
- a first PUSCH of larger priority index on a serving cell, a second PUSCH of smaller priority index on the serving cell, and a transmission of the first PUSCH would overlap in time with a transmission of the second PUSCH, the UE 102 may not transmit the second PUSCH, where at least one of the two PUSCH is not scheduled by a DCI format.

In some approaches (e.g., NR Rel-16), a UE 102 may only multiplex UCIs with a same priority index in a PUCCH or a PUSCH. A PUCCH or a PUSCH may be assumed to have a same priority index as a priority index of UCIs a UE 102 multiplexes in the PUCCH or the PUSCH. For intra-UE collision between uplink channels with different priorities, the uplink channel with high priority may be transmitted, and the low priority channel may be dropped.

If a UE 102 is provided two PUCCH-Config:

- if the UE 102 is provided subslotLengthForPUCCH-r16 in the first PUCCH-Config, the PUCCH resource for any SR configuration with priority index 0 or any CSI report configuration in any PUCCH-Config may be within the subslotLengthForPUCCH-r16 symbols in the first PUCCH-Config; or
- if the UE 102 is provided subslotLengthForPUCCH-r16 in the second PUCCH-Config, the PUCCH resource for any SR configuration with priority index 1 in any PUCCH-Config may be within the subslotLengthForPUCCH-r16 symbols in the second PUCCH-Config.

In some examples, if a UE 102 is not provided subslot-Length-ForPUCCH, a slot for an associated PUCCH transmission may include all symbols in a slot, 14 symbols with normal cyclic prefix, or 12 symbols with extended cyclic prefix. In some examples, if a UE 102 is provided subslot-Length-ForPUCCH, a slot for an associated PUCCH transmission may include a number of symbols indicated by subslotLengthForPUCCH.

In some approaches, UCI multiplexing on PUSCH may be performed in accordance with the following. If a PUCCH carrying a UCI overlaps with a PUSCH, the UCI may be multiplexed on PUSCH if simultaneous PUCCH and PUSCH is not configured or supported. In some examples, if simultaneous PUCCH and PUSCH is not supported on the same carrier, UCI multiplexing on PUSCH may be performed when the PUCCH and PUSCH are on the same carrier. In some examples, only HARQ-ACK and CSI may be multiplexed on PUSCH, and SR may not be multiplexed on PUSCH in some approaches.

When UCI is multiplexed on a PUSCH, the overlapping condition of the PUCCH for a UCI type may be evaluated separately with the PUSCH, and the UCI multiplexing of different UCI types may be multiplexed on PUSCH based on the UCI types, for example, the HARQ-ACK may be multiplexed first based on the number of HARQ-ACK bits, followed by CSI which is rate matched after the HARQ-ACK multiplexing.

Offset values may be defined for a UE 102 to determine a number of resources for multiplexing HARQ-ACK information and for multiplexing CSI reports in a PUSCH. Offset values may also be defined for multiplexing configured grant UCI (CG-UCI) in a configured grant PUSCH (CG-PUSCH). The offset values may be signaled to a UE 102 either by a DCI format scheduling the PUSCH transmission or by higher layers.

In some approaches (e.g., Rel-15), only one service type (e.g., eMBB) may be supported, and simultaneous PUCCH and PUSCH may not be supported. Some timeline restrictions are specified in Rel-15 for UCI multiplexing on PUSCH. For instance, a UE may not be expected to receive a PUCCH and an overlapping PUSCH that does not satisfy the timeline requirements. In some approaches, UCI multiplexing may be always performed in case of overlap between a PUCCH and a PUSCH.

In some approaches (e.g., Rel-16), different service types (e.g., eMBB and URLLC) may be supported. For a PUSCH with a given priority index, only the UCI with the same priority carried on a PUCCH with the same priority may be multiplexed on the PUSCH in some approaches.

In a case of overlap between channels with different priorities, a channel dropping rule may be defined so that the high priority channel is transmitted, and the low priority channel is dropped in some approaches. Dropping timelines may be defined for different types of UL channels and UCI types.

In some approaches (e.g., NR Rel-17), UCI of different priorities may be multiplexed on a single PUCCH or PUSCH. Furthermore, a UCI with a given priority may be multiplexed on a PUSCH with different priorities. To differentiate the priority of a UCI, different offset values or sets of offset values may be configured for different combinations between the HARQ-ACK priority and PUSCH priority. For instance, using HARQ-ACK as an example, the following UCI multiplexing scenarios may be supported:

HP HARQ-ACK on HP PUSCH
LP HARQ-ACK on LP PUSCH
HP HARQ-ACK on LP PUSCH
P HARQ-ACK on HP PUSCH

In some examples, HARQ-ACK of different priorities may be reported on a single PUSCH, including:

HP HARQ-ACK and LP HARQ-ACK on LP PUSCH
HP HARQ-ACK and LP HARQ-ACK on HP PUSCH

CSI may be treated as low priority (in Rel-16, for instance). In some approaches, if CSI is present on a LP PUSCH, the HP UCI may also be multiplexed on a LP PUSCH, including:

HP HARQ-ACK and CSI on LP PUSCH

HP HARQ-ACK, LP HARQ-ACK and CSI on LP PUSCH

The CSI may be a periodic CSI, a semi-persistent CSI, or an aperiodic CSI. When multiplexed together with HP UCI on PUSCH, the low priority CSI may be limited to CSI part 1 only.

In some approaches (e.g., Rel-17), CSI enhancements may be considered, and some new CSI reports may be supported for URLLC or the high priority service. The new CSI reports may be treated as high priority, or indicated as high priority (i.e., priority index 1). The HP CSI may be reported together with HP HARQ-ACK on a PUCCH or PUSCH.

Figures 8A, 8B:
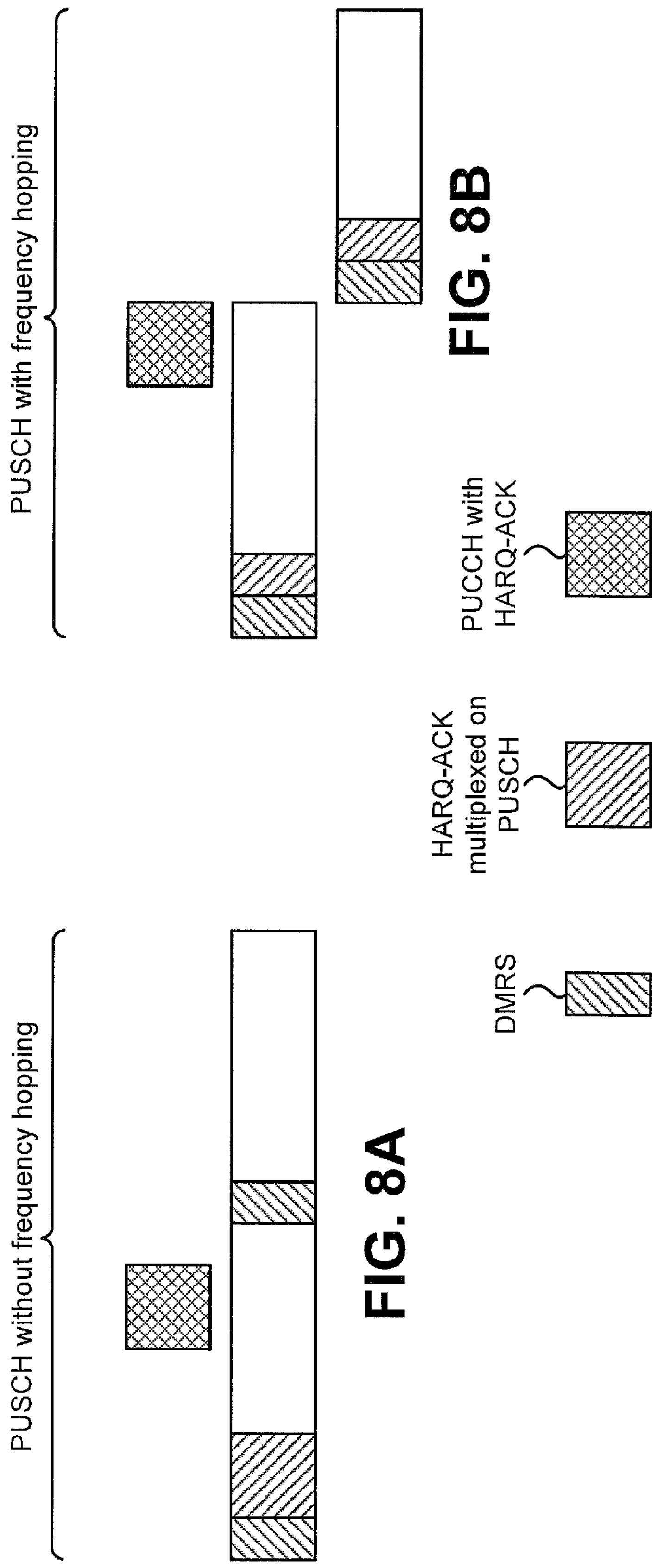
FIG. 8A is a diagram illustrating an example of HARQ-ACK multiplexing on a PUSCH without frequency hopping.
FIG. 8B is a diagram illustrating an example of HARQ-ACK multiplexing on a PUSCH with frequency hopping

HP HARQ-ACK multiplexing on PUSCH may present potential problems. Some examples of the techniques described herein provide approaches for HARQ-ACK multiplexing on PUSCH. In some approaches, for HARQ-ACK multiplexing on PUSCH of the same priority, multiplexing procedures and locations may be determined based on a HARQ-ACK payload and frequency hopping configurations, as shown in FIGS. 8A-8B.

If the number of HARQ-ACK (e.g., HARQ-ACK bit(s)) is up to 2 bits, a set of reserved locations and resource element (RE) resources may be used. The number of reserved HARQ-ACK locations and RE resources may be achieved by calculating the rate-matching length of the HARQ-ACK with the number of HARQ-ACK bits set to 2. The HARQ-ACK may be mapped to the REs in an OFDM symbol that is available after the first consecutive DM-RS OFDM symbols.

If the number of HARQ-ACK (e.g., HARQ-ACK bit(s)) is more than 2 bits, the coded HARQ-ACK bits may be mapped starting at REs starting from the OFDM symbol that is available after the first consecutive DM-RS OFDM symbols.

If frequency hopping is configured, the HARQ-ACK may be multiplexed on both hops (e.g., the HARQ-ACK multiplexed REs may be distributed in two hops).

If a UE 102 is provided two PUCCH-Config, HP PUCCH resources (e.g., PUCCH resources with priority 1) may be configured to report the HP HARQ-ACK (e.g., HARQ-ACK with priority index 1). LP PUCCH resources (e.g., PUCCH resources with priority 0) may be configured to report the LP HARQ-ACK (e.g., HARQ-ACK with priority index 0).

In some examples, the PUCCH resources may be configured with slot(s) or subslot(s). In an example, the HP PUCCH resources may be configured with subslot(s) (e.g., a subslot structure), and the LP PUCCH resources may be configured with slot(s) (e.g., a slot structure). The subslot duration may be 2 or 7 symbols. In another example, the HP PUCCH resources may be configured with subslot(s) (e.g., a subslot structure), and the LP PUCCH may be configured with subslot(s) (e.g., a subslot structure). In this case, the subslot duration configured for the HP PUCCH may be shorter than or the same as the sublot duration for the LP PUCCH. In some examples, there may be no subslot configuration for a PUSCH. Thus, a PUSCH may be scheduled with any number of symbols in a slot in some approaches.

If the HP PUCCH is configured with subslot(s) (e.g., a subslot structure), HP HARQ-ACK may be reported in each subslot. Accordingly, a HP PUSCH or a LP PUSCH may overlap with multiple HP PUCCH carrying HP HARQ-ACK.

Figure 9:
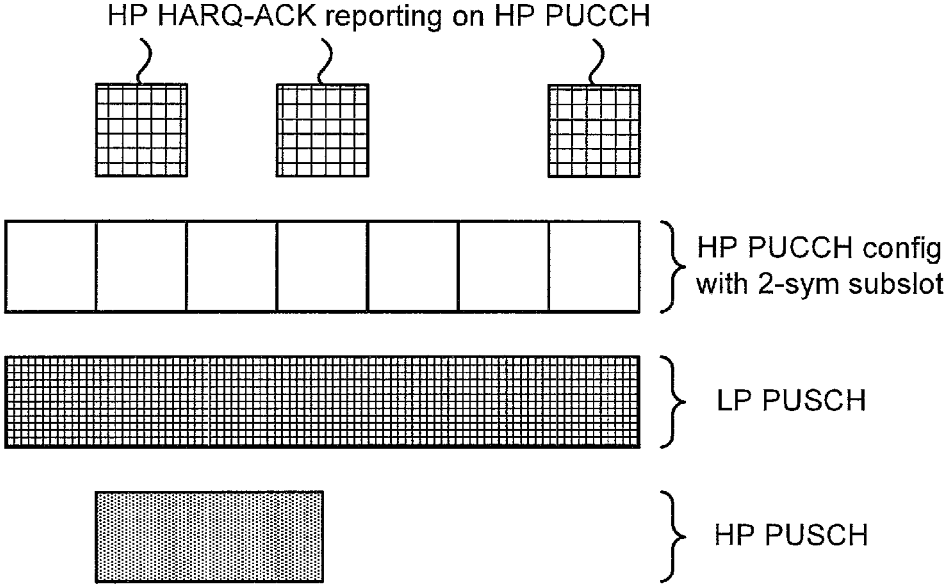
FIG. 9 is a diagram illustrating an example of multiple HP PUCCHs for HP HARQ-ACK overlapping with a LP PUSCH and/or a HP PUSCH.

In an example shown in FIG. 9, the HP PUCCH is configured with a subslot duration of 2 symbols. Accordingly, there are potentially 7 PUCCH transmissions for HARQ-ACK reporting. In the example shown in FIG. 9, there are three instances of HP HARQ-ACK reporting on the HP PUCCH corresponding to HP PDSCH transmissions. In some approaches, all HP PUCCHs overlap with the LP PUSCH, which occupies all symbols in the slot. Similarly, in this example, a HP PUSCH also overlaps with two HP PUCCHs carrying HARQ-ACK. If a 7-symbol subslot is configured, each subslot may have a HP PUCCH for HP HARQ-ACK reporting. Thus, a slot may potentially have 2 HP PUCCH transmissions.

In some approaches, only one HARQ-ACK codebook of each priority is considered for multiplexing on a PUSCH. If there are multiple HP PUCCHs carrying HP HARQ-ACKs overlapping with a PUSCH, directly using these approaches may cause several potential problems. For instance, the multiple HP HARQ-ACK may be multiplexed on the same REs or symbols following the HP HARQ-ACK multiplexing procedures on PUSCH. The timing relationship between the HP PDSCH and the HP HARQ-ACK may be changed. Accordingly, it may be beneficial to provide approaches to deal with multiple HP PUCCHs with HP HARQ-ACK overlapping with a PUSCH.

Multiple HP PUCCHs with HP HARQ-ACK may occur in many different scenarios between PUCCHs and PUSCHs with different types, for example:

A HP PUCCH may be scheduled by one or more DCIs with the HARQ-ACK timing indication.

A HP PUCCH may be configured for SPS transmission with high priority.

A HP PUCCH may be a deferred retransmission of an earlier HP PUCCH for SPS that conflicts with a SFI configuration.

A HP PUSCH may be dynamically scheduled by a DCI with timing indication.

A HP PUSCH may be a transmission from a configured grant.

In some examples, the UE 102 (e.g., UE operations module 124 and/or UE scheduling module 126) and/or the gNB 160 (e.g., gNB operations module 182 and/or gNB scheduling module 194) may determine that a PUSCH with HP overlaps with multiple HP PUCCHs carrying HP HARQ-ACKs (e.g., one or more HP HARQ-ACKs per HP PUCCH). For instance, the gNB 160 (e.g., gNB scheduling module 194) may schedule a HP PUSCH and/or may schedule multiple HP PUCCHs carrying HP HARQ-ACKs, where the HP PUCCHs overlap in time (e.g., slot(s) and/or subslot(s)) with the HP PUSCH. In some examples, the UE 102 may receive one or more scheduling indications that may schedule a HP PUSCH and/or may schedule multiple HP PUCCHs carrying HP HARQ-ACKs, where the HP PUCCHs overlap in time (e.g., slot(s) and/or subslot(s)) with the HP PUSCH.

In some examples of the techniques described herein, a UE (e.g., UE 102) may transmit or may not transmit information (e.g., PUSCH, PUCCH, UCI, SR, and/or HARQ-ACK, etc.). In some examples, a base station (e.g., gNB 160) correspondingly may receive or may not receive the information (e.g., PUSCH, PUCCH, UCI, SR, and/or HARQ-ACK, etc.) described in relation to a UE herein. In some examples, the UE 102 (e.g., UE operations module 124 and/or UE scheduling module 126) may perform one or more of the operations described in relation to one or more of the Figures described herein. In some examples, the gNB 160 (e.g., gNB operations module 182 and/or gNB scheduling module 194) may perform one or more of the operations described in relation to one or more of the Figures described herein.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented. In some examples, one or more of the components (e.g., the gNB operations module 182) of the gNB 160 may be implemented in hardware, a combination of hardware and instructions, one or more circuitries, and/or one or more processors. For instance, one or more of the components of the gNB 160 may be included in one or more circuitries, one or more modems, one or more RF front ends, and/or one or more processors, etc.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein. In some examples, the gNB scheduling module 194 may be utilized to configure collision resolution procedures and/or to receive communications from a UE in accordance with the procedures described herein. For instance, the gNB 160, the gNB operations module 182, and/or the gNB scheduling module 194 may receive transmissions from the UE in accordance with one or more of the methods, operations, functions, approaches, and/or examples described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
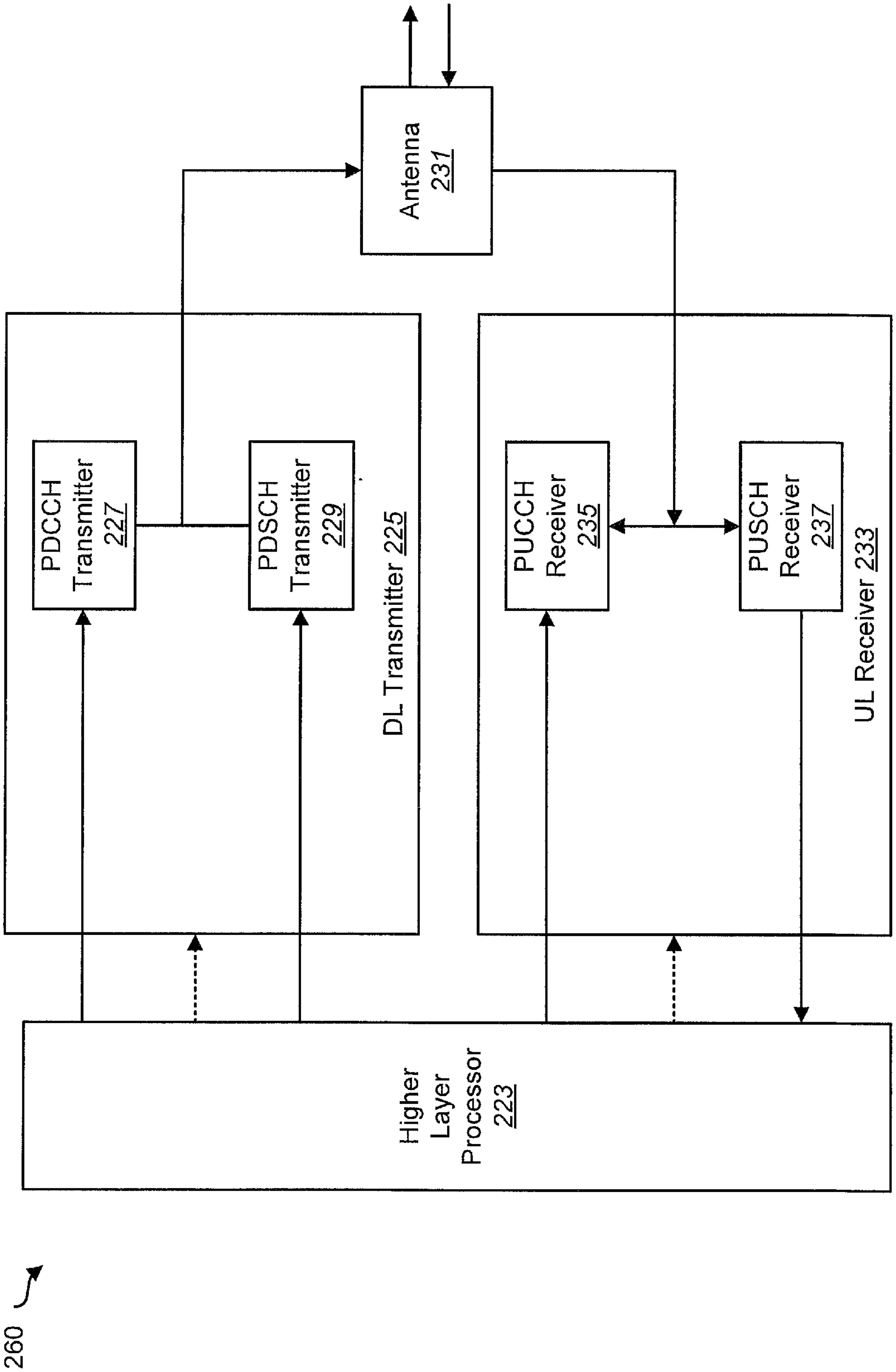
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
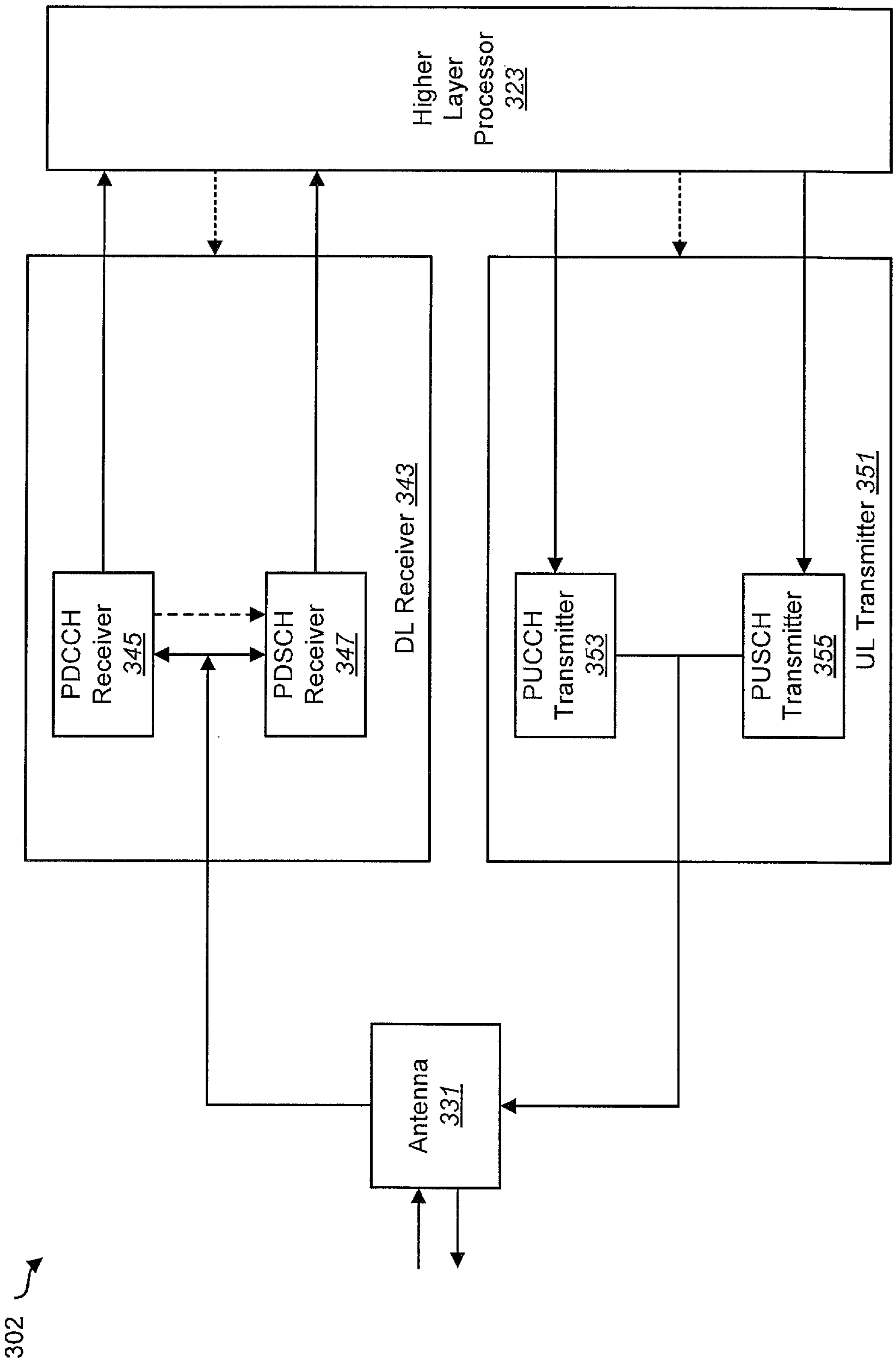
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323 DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
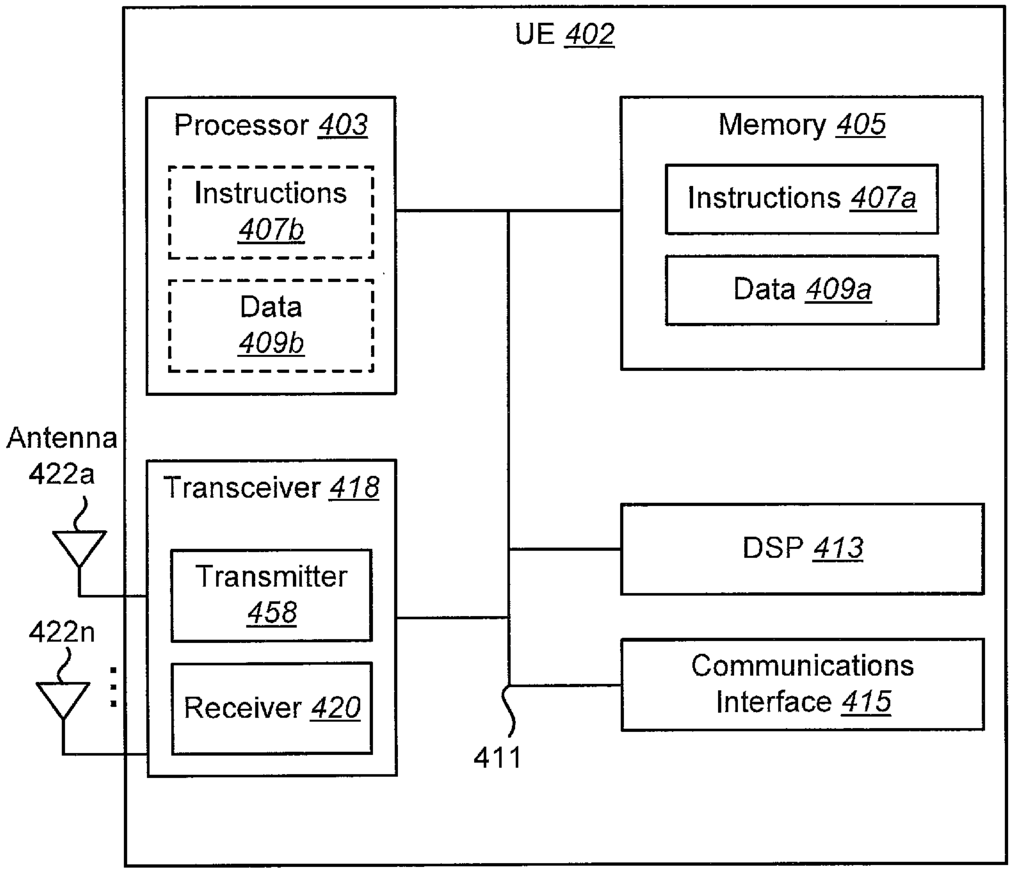
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. In some examples, the UE 402 may perform one or more of the methods, approaches, functions, operations, and/or examples, etc., described herein. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions **407*a* and data 409*a* to the processor 403. A portion of the memory 405 may also include non-volatile random-access memory (NVRAM). Instructions 407*b* and data 409*b* may also reside in the processor 403. Instructions 407*b* and/or data 409*b* loaded into the processor 403 may also include instructions 407*a* and/or data 409*a* from memory 405 that were loaded for execution or processing by the processor 403. The instructions 407*b* may be executed by the processor 403** to implement one or more of the methods, approaches, functions, operations, and/or examples described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas **422*a-n* are attached to the housing and electrically coupled to the transceiver 418**.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
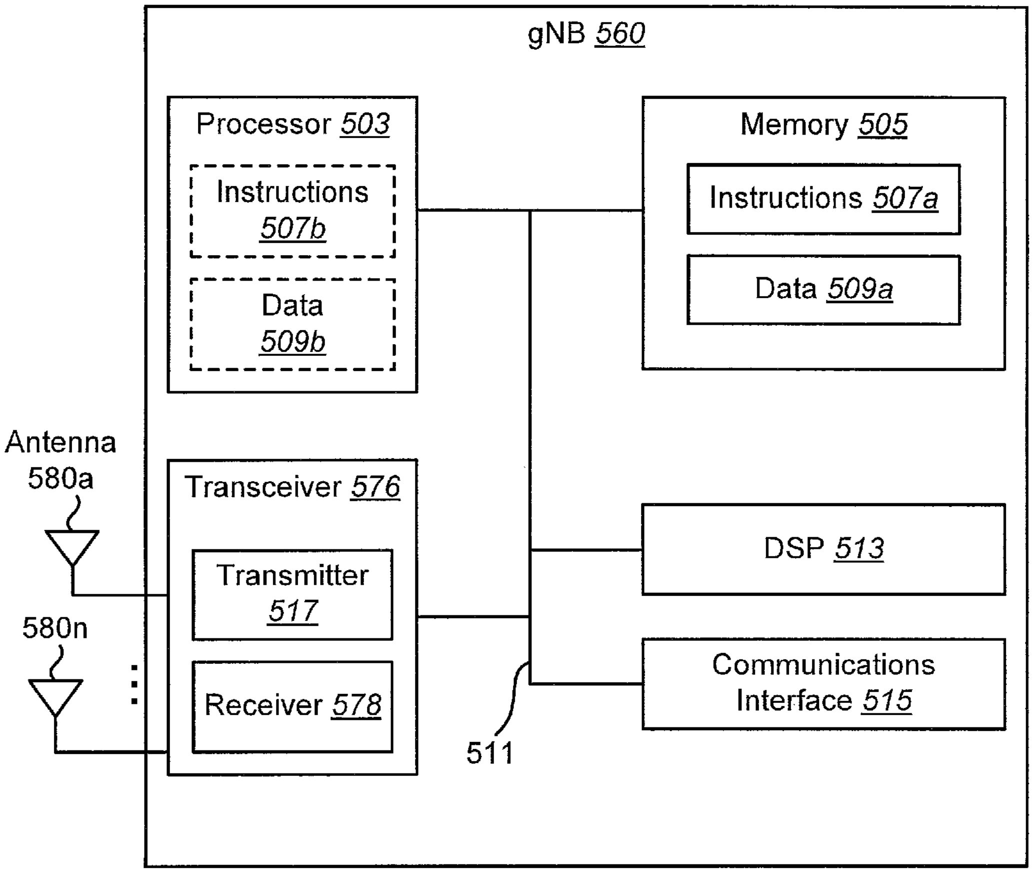
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. In some examples, the gNB 560 may perform one or more of the methods, functions, operations, and/or examples, etc., described herein. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507*a* and data 509*a* to the processor 503. A portion of the memory 505 may also include non-volatile random-access memory (NVRAM). Instructions 507*b* and data 509*b* may also reside in the processor 503. Instructions 507*b* and/or data 509*b* loaded into the processor 503 may also include instructions 507*a* and/or data 509*a* from memory 505 that were loaded for execution or processing by the processor 503. The instructions 507*b* may be executed by the processor 503 to implement one or more of the methods, approaches, functions, operations, and/or examples described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580*a-n* are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
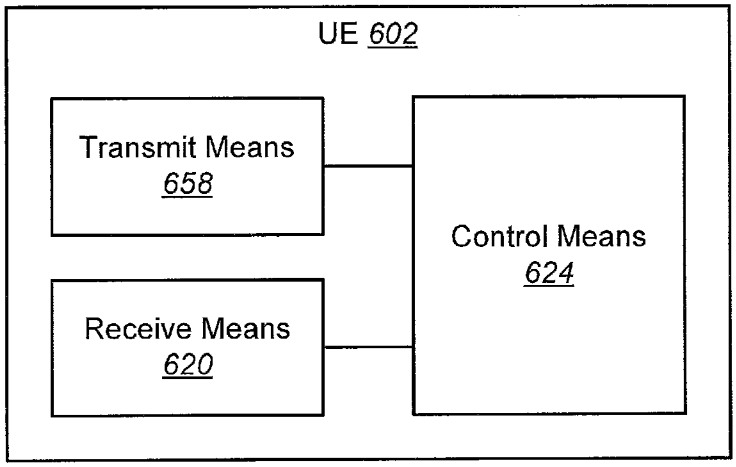
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
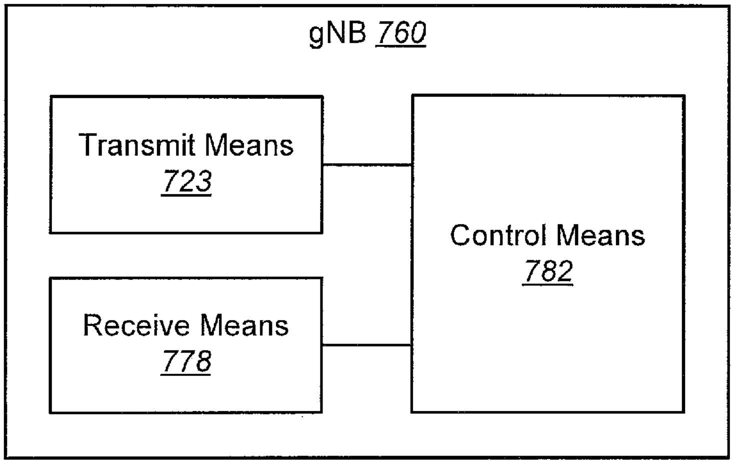
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

Some examples of the techniques described herein may provide one or more approaches for collision resolution between multiple high priority HARQ-ACK and a high priority PUSCH. For intra-UE collision resolution, the uplink channels with the same priority may be performed first. For uplink channels with high priority (e.g., priority index 1), the PUCCH for HARQ-ACK may be configured with a subslot structure. In some examples, the PUSCH scheduling may be more flexible and no subslot may be defined. Thus, potentially, more than one HP PUCCH with HP HARQ-ACK may overlap with a HP PUSCH.

In some examples (e.g., examples where Rel-15 intra-UE UCI multiplexing timeline may be applicable for collision resolution in Rel-17), HP HARQ-ACK multiplexing on HP PUSCH may be performed. One or more approaches may be implemented to handle the potential multiple HP HARQ-ACK multiplexing on a single HP PUSCH case.

FIG. 8A is a diagram illustrating an example of HARQ-ACK multiplexing on a PUSCH without frequency hopping. For instance, FIG. 8A illustrates an arrangement of demodulation reference signal(s) (DMRS), HARQ-ACK multiplexed on PUSCH, and PUCCH with HARQ-ACK for PUSCH without frequency hopping as described in relation to FIG. 1.

FIG. 8B is a diagram illustrating an example of HARQ-ACK multiplexing on a PUSCH with frequency hopping. For instance, FIG. 8B illustrates an arrangement of DMRS, HARQ-ACK multiplexed on PUSCH, and PUCCH with HARQ-ACK for PUSCH with frequency hopping as described in relation to FIG. 1.

FIG. 9 is a diagram illustrating an example of multiple HP PUCCHs for HP HARQ-ACK overlapping with a LP PUSCH and/or a HP PUSCH. For instance, FIG. 9 illustrates an example of HP HARQ-ACK reporting on HP PUCCH with a HP PUCCH configuration with a 2-symbol subslot, LP PUSCH, and/or HP PUSCH as described in relation to FIG. 1.

Collision handling between multiple HP HARQ-ACK and a LP PUSCH The following describes timeline considerations for HP HARQ-ACK multiplexing on LP PUSCH.

If simultaneous PUCCH and PUSCH is supported, and the PUCCH and PUSCH are carried on different carriers, the HP PUCCH and LP PUSCH may be transmitted simultaneously.

If simultaneous PUCCH and PUSCH is not supported, or if the PUCCH and PUSCH are carried on the same carrier, UCI multiplexing should be performed so that the HP HARQ-ACK is multiplexed on the LP PUSCH.

With the HP HARQ-ACK carried on HP PUCCHs with subslot structure, only one HARQ-ACK PUCCH can be reported in each subslot. Thus, there should be no overlapping between the HP PUCCHs carrying HP HARQ-ACK.

In Rel-17, for handling overlapping PUCCHs/PUSCHs with different priorities, two steps will be performed. In Step 1, resolve overlapping PUCCHs and/or PUSCHs with the same priority, and in Step 2, resolve overlapping PUCCHs and/or PUSCHs with different priorities.

After Step 1, there will be only one HP PUCCH carrying HARQ-ACK left in a subslot. Since HP traffic and LP traffic are scheduled separately, it is very likely multiple HP HARQ-ACK may overlap a LP PUSCH as shown above.

In Rel-16, in case of overlapping between channels with different priorities, the channel dropping rule is defined so that the high priority channel is transmitted, and the low priority channel is dropped. And dropping timelines are defined for different types of UL channels and UCI types.

In NR Rel-17, HP HARQ-ACK multiplexing on a LP PUSCH is supported with an additional sets of beta offset values from the beta offset values for HARQ-ACK on the PUSCH with the same priority. However, at the time of this writing, the detailed HARQ-ACK multiplexing methods on a PUSCH with different priorities are not agreed and not specified yet.

For a HP HARQ-ACK multiplexing on a LP PUSCH, many aspects still need to be determined, e.g.:

The HARQ-ACK multiplexing location

Restrictions on the symbols that HP HARQ-ACK can be multiplexed

Depending on the multiplexing methods, for overlapping between a HP PUCCH and a LP PUSCH, some timing conditions may be considered regarding whether the HP HARQ-ACK can be multiplexed on the LP PUSCH.

In Rel-15, only UCI multiplexing with the same priority is supported, and UE assumes that the timeline requirements are always satisfied for overlapping channels. In Rel-16 collision between channels with different priorities, some dropping timeline is introduced to determine when a LP channel can be cancelled by a HP channel.

Figure 10:
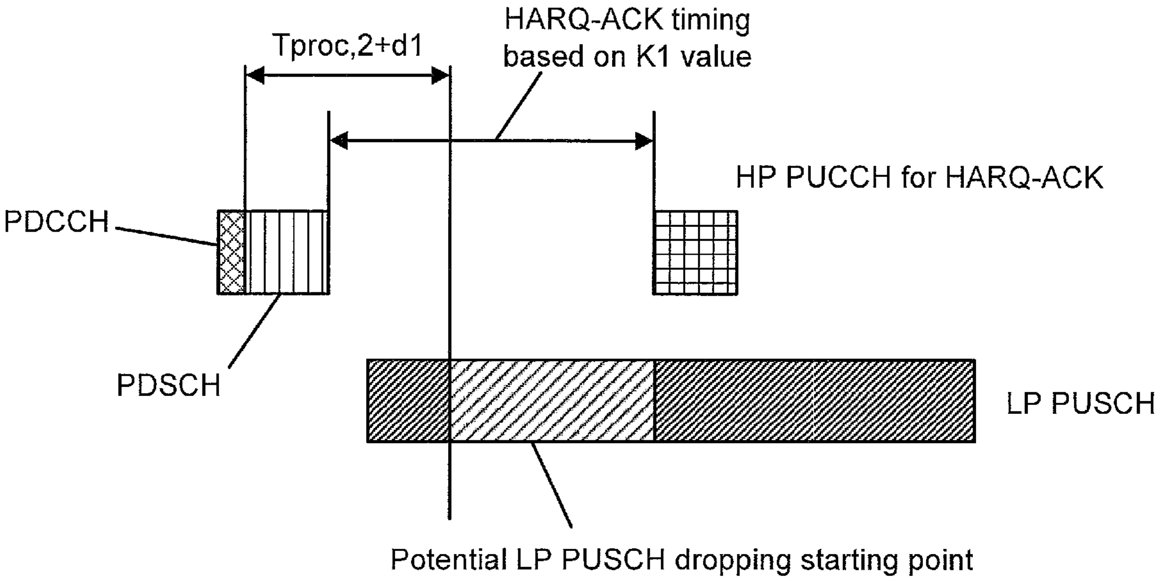
FIG. 10 is a timeline for channel dropping and shows an example between a HP PUCCH with HP HARQ-ACK and a LP PUSCH.

FIG. 10 is a timeline for channel dropping and shows an example between a HP PUCCH with HP HARQ-ACK and a LP PUSCH. The UE is not expected to know the HP PUCCH transmission at least after T_(proc,2) after a last symbol of the corresponding PDCCH reception for the HP PDSCH transmission. Thus, the UE can cancel the LP at least before the first symbol that would overlap with the first PUCCH transmission, but no earlier than T_(proc,2)+d_1 after a last symbol of the corresponding PDCCH reception for the HP PDSCH transmission. T_(proc,2) is the PUSCH preparation time for a corresponding UE processing capability assuming d_2,1=d_1, based on and N_2, and d_1 is determined by a reported UE capability.

Figure 11:
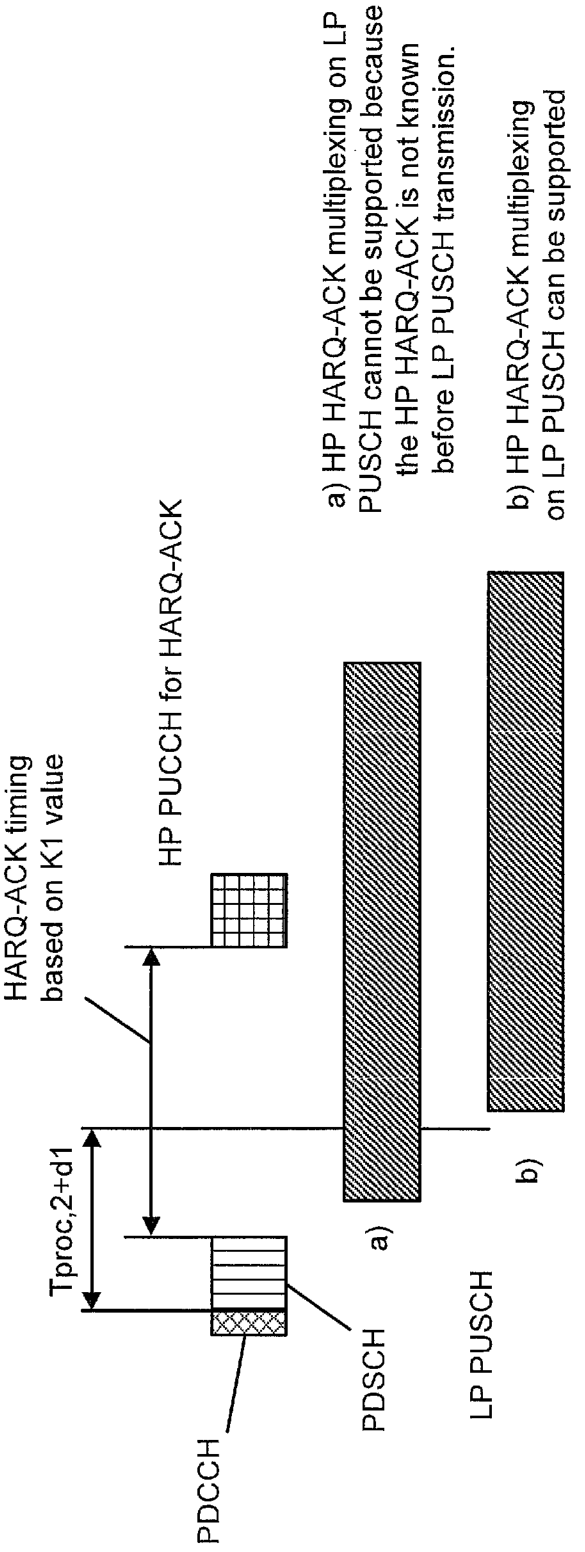
FIG. 11 is a timeline illustrating an example of another approach for collision resolution in accordance with some of the techniques described herein.

If a UE is scheduled by a DCI format in a first PDCCH reception to transmit a first PUCCH or a first PUSCH of larger priority index that overlaps with a second PUCCH or a second PUSCH transmission of smaller priority index that, if any, is scheduled by a DCI format in a second PDCCH $T_{proc,2}$ is based on a value of p corresponding to the smallest SCS configuration of the first PDCCH, the second PDCCHs, the first PUCCH or the first PUSCH, and the second PUCCHs or the second PUSCHs if the overlapping group includes the first PUCCH if processingType2Enabled of PDSCH-ServingCellConfig is set to enable for the serving cell where the UE receives the first PDCCH and for all serving cells where the UE receives the PDSCHs corresponding to the second PUCCHs, and if processingType2Enabled of PUSCH-ServingCellConfig is set to enable for the serving cells with the second PUSCHs, $N_2$ is 5 for $\mu=0$, 5.5 for $\mu=1$ and 11 for $\mu=2$ else, $N_2$ is 10 for $\mu=0$, 12 for $\mu=1$, 23 for $\mu=2$, and 36 for $\mu=3$;

if the overlapping group includes the first PUSCH if processingType2Enabled of PUSCH-ServingCellConfig is set to enable for the serving cells with the first PUSCH and the second PUSCHs and if processingType2Enabled of PDSCH-ServingCellConfig is set to enable for all serving cells where the UE receives the PDSCHs corresponding to the second PUCCHs, $N_2$ is 5 for $\mu=0$, 5.5 for $\mu=1$ and 11 for $\mu=2$ else, $N_2$ is 10 for $\mu=0$, 12 for $\mu=1$, 23 for $\mu=2$, and 36 for $\mu=3$;

For UCI multiplexing with different priorities, one timeline restriction for multiplexing is that the presence of the PUCCH for HP HARQ-ACK should be known before the LP PUSCH transmission, as shown in FIG. 11. For a HP PUCCH corresponding to a PDSCH transmission, the UE knows the existence of the HP PUCCH at least T_(proc,2) after a last symbol of the corresponding PDCCH reception for the PDSCH transmission. In order to perform UCI multiplexing on PUSCH, additional symbols may be needed, e.g. T_(proc,2)+d_1 after a last symbol of the corresponding PDCCH reception for the PDSCH transmission. The additional d_1 can be determined based on UE capabilities. The additional d_1 symbols may be used to perform UCI multiplexing process since it requires more computation than channel dropping.

FIG. 11 is a timing diagram of HP HARQ-ACK multiplexing on LP PUSCH timeline.

The UCI multiplexing timeline should be evaluated so that the transmission of the PUCCH carrying the HARQ-ACK is known at least before the transmission of the HP PUSCH. In case of multiple HP PUCCH overlaps with a HP PUSCH, if the timeline condition cannot be satisfied for an earlier overlapping PUCCH, the timeline cannot be satisfied for a later overlapping PUCCH either.

For an overlapping HP PUCCH and a LP PUSCH, if the timeline conditions can be met, the HP HARQ-ACK may be multiplexed on the overlapping LP PUSCH.

And if the timeline conditions cannot be met for a HP PUCCH with HP HARQ-ACK, the HP PUCCH may have a higher priority than the LP PUSCH. Thus, the HP PUCCH carrying a HP HARQ-ACK may drop the LP PUSCH at least from the overlapping symbol between the PUCCH and the PUSCH. Once dropped the LP PUSCH should not be resumed. However, the earliest dropping time may need to be revised from existing dropping timeline if there are HP HARQ-ACK already multiplexed on the LP PUSCH.

Figure 12:
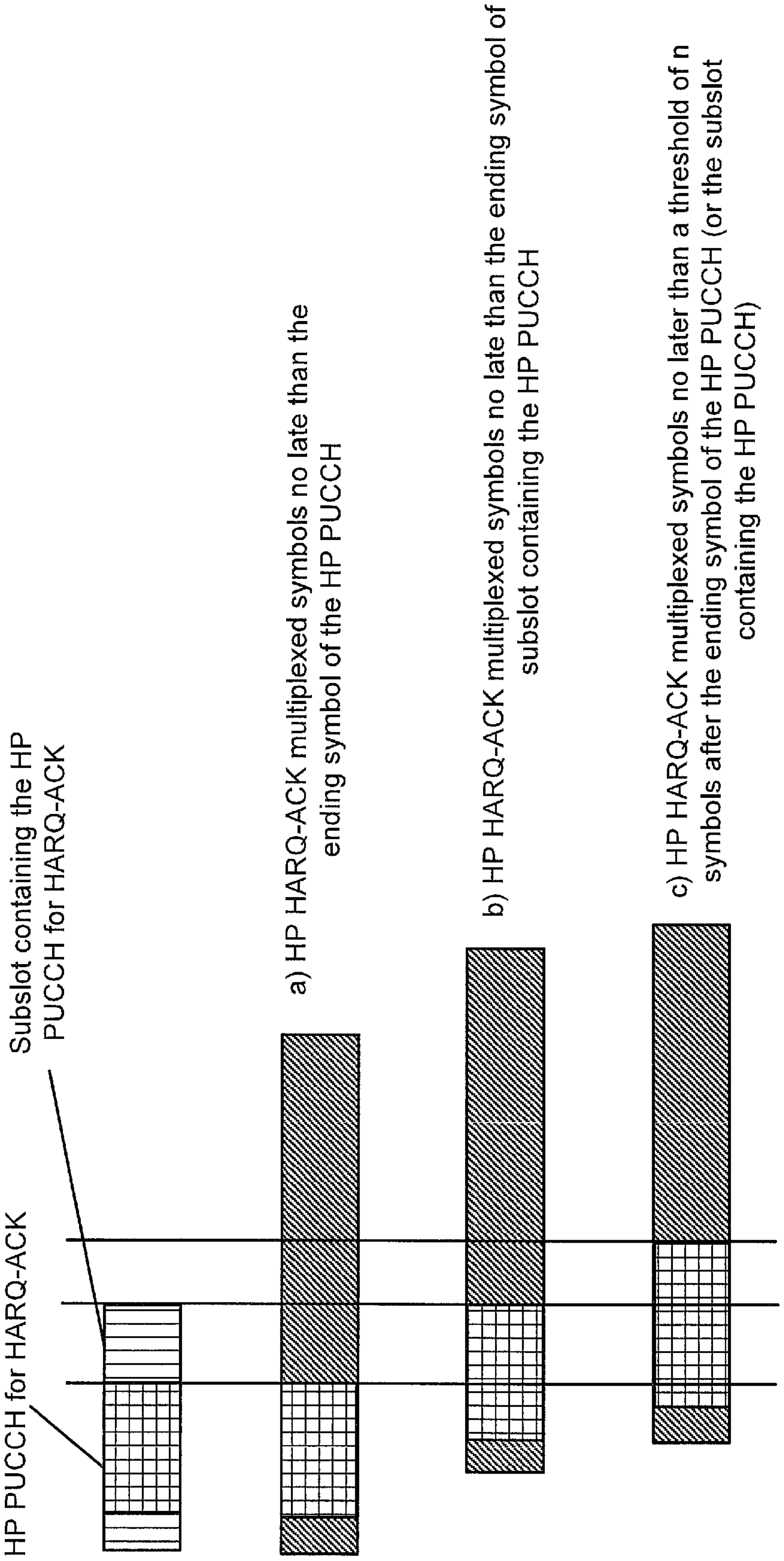
FIG. 12 is a timeline illustrating an example of another approach for collision resolution in accordance with some of the techniques described herein.

FIG. 12 is a timing diagram illustrating HARQ-ACK multiplexing delay timeline restrictions. Since HP HARQ-ACK is delay sensitive, another set of timeline requirements for HP HARQ-ACK multiplexing may be the delay tolerance of HARQ-ACK information on PUSCH. In an example of HARQ-ACK multiplexing timeline restrictions, the HP HARQ-ACK multiplexed symbols should be no later than the last symbol of the corresponding HP PUCCH carrying the HP HARQ-ACK, as shown in FIG. 12(*a*). In another example of HARQ-ACK multiplexing timeline restrictions, the HP HARQ-ACK multiplexed symbols should be no late than the last symbol of the subslot carrying the HP PUCCH, as shown in FIG. 12(*b*). As another example of HARQ-ACK multiplexing timeline restrictions, some tolerance thresholds may be used, e.g. a number of symbols n, so that the HP HARQ-ACK multiplexed symbols should be within the tolerance thresholds n symbols from the end of original HP PUCCH or from the end of the subslot for the HP PUCCH, as shown in FIG. 12(*c*). Furthermore, to reduce the latency, the HP HARQ-ACK may be multiplexed on a single hop even if frequency hopping is configured.

For a HP SPS PDSCH transmission, the HP SPS HARQ-ACK may be deferred if the SPS PUCCH resource cannot be satisfied due to slot format indication (SFI) configuration in the initial slot. The deferred HP HARQ-ACK can be reported in a later HP PUCCH. A maximum deferral limit is defined to determine the maximum allowed delay of the target PUCCH transmission form the initial HARQ-ACK transmission.

Similarly, for HP HARQ-ACK multiplexing on a LP PUSCH, the HP HARQ-ACK is multiplexed within the slot which includes the HP PUCCH subslot. A maximum delay tolerance may be defined as the number of subslots the HP HARQ-ACK can be delayed calculated by the distance between the end of the original HP PUCCH and the last symbol with the same HP HARQ-ACK multiplexed on the LP PUSCH. In one example, the delay constraints of a HP HARQ-ACK may be relaxed within the slot. Thus, the HP HARQ-ACK multiplexed on the LP PUSCH is always considered to be within the delay tolerance.

Therefore, even if the transmission of a HP PUCCH with HP HARQ-ACK is known before the LP PUSCH transmission, if the multiplexed symbols for the HP HARQ-ACK on the LP PUSCH cannot satisfy the delay requirements, the HP HARQ-ACK should not be multiplexed on the LP PUSCH, and channel dropping should be performed.

Thus, new methods should be considered for UCI multiplexing on the LP PUSCH besides channel dropping. If channel dropping cannot be avoided due to timeline constraints, the dropping timeline should be reconsidered to avoid dropping the UCI already multiplexed on the PUSCH from earlier overlapping PUCCH(s).

Depending on the detailed HP HARQ-ACK multiplexing rules on LP PUSCH, different methods can be considered to handle overlapping between multiple HP HARQ-ACK PUCCHs and LP PUSCH.

Approach 1: Define different multiplexing methods with RE mapping restrictions for HP HARQ-ACKs from different HP PUCCHs With approach 1, multiple methods may be defined for HP HARQ-ACK multiplexing on LP PUSCH.

A first HP HARQ-ACK multiplexing method on a LP PUSCH may be specified so that the HP HARQ-ACK is multiplexed starting from the OFDM symbol that is available after the first consecutive DM-RS OFDM symbols. The first HP HARQ-ACK multiplexing method may the default multiplexing method for HP HARQ-ACK multiplexing on LP PUSCH, esp. if only one HP PUCCH with HP HARQ-ACK overlaps with the LP PUSCH.

A second HARQ-ACK multiplexing method can be specified so that the HP HARQ-ACK from a HP PUCCH is multiplexed on the REs from the first available symbol in a confined set of symbols.

- In one approach, the confined set of symbols is determined by the overlapping symbols between the LP PUSCH and the HP PUCCH for the HP HARQ-ACK.
- In another approach, the confined set of symbols are determined by the symbols of the subslot where the HP PUCCH for the HP HARQ-ACK is contained.

Thus, with the second approach, the HP HARQ-ACK of each HP PUCCH can be multiplexing on the LP PUSCH by puncturing the REs on the PUSCH in the multiplexing symbols determined above.

With different HARQ-ACK multiplexing methods specified on a PUSCH, the UE may choose the multiplexing method based on whether there are more than one HP PUCCH for HARQ-ACK overlaps with a LP PUSCH. That is,

- If there is only one HP PUCCH with HP HARQ-ACK overlaps with a LP PUSCH, the first HARQ-ACK multiplexing method is used, i.e., the HP HARQ-ACK is multiplexed starting from the OFDM symbol that is available after the first consecutive DM-RS OFDM symbols
- If there are more than one HP PUCCH with HP HARQ-ACK overlap with a LP PUSCH, the second HARQ-ACK multiplexing method is used, i.e. for each overlapping HP PUCCH carrying the HP HARQ-ACK, the corresponding HP HARQ-ACK is multiplexed on the confined symbols.

Alternatively, the first multiplexing method may be applied for the first HP HARQ-ACK carried on the first overlapping HP PUCCH. And for the later overlapping HP PUCCHs with HP HARQ-ACKs, the second HARQ-ACK multiplexing method is used, so that the HP HARQ-ACK is multiplexed on the REs from the first available symbol in the confined symbols determined above.

Benefit of Approach 1:

- Different multiplexing methods are used based on overlapping conditions.
- The original PUCCH HARQ-ACK timing is maintained on PUSCH
- No overwriting of multiplexed HARQ-ACK by later HARQ-ACK Approach 2: Only the HP HARQ-ACK of the first HP PUCCH can be multiplexed on LP PUSCH In this method, only one HP HARQ-ACK can be multiplexed on the PUSCH based on the time of the HP PUCCH. The channel resolution is performed according to the timeline. Whether HP HARQ-ACK multiplexing on LP PUSCH is supported is determined by the first (i.e. the earliest) overlapping HP PUCCH with HP HARQ-ACK.

If the first overlapping HP PUCCH with HP HARQ-ACK cannot be multiplexed on the LP PUSCH due to timeline cannot be satisfied, channel dropping is performed. Thus, the LP PUSCH is dropped, and all overlapping HP PUCCHs with HP HARQ-ACKs are transmitted.

If the first overlapping HP PUCCH with HP HARQ-ACK can be multiplexed on the LP PUSCH because the timeline is satisfied. The HP HARQ-ACK from the first overlapping HP PUCCH is multiplexed on the LP PUSCH. And the UE may perform channel dropping for other overlapping HP PUCCH carrying HP HARQ-ACK. But the channel dropping timeline may be modified depending on the HP HARQ-ACK multiplexed symbols on the LP PUSCH.

In Rel-16 channel dropping, the UE cancels the transmission of the LP PUSCH before the first symbol that would overlap with the HP PUCCH transmission, but the UE expects that the transmission of the HP PUCCH would not start before T_(proc,2)+d_1 after a last symbol of the corresponding PDCCH reception for the HP HARQ-ACK feedback, as shown in FIG. 10. That is to say, the UE may cancel the LP PUSCH transmission from T_(proc,2)+d_1 after a last symbol of the corresponding PDCCH reception for HP PDSCH included in the HP HARQ-ACK feedback.

If the HP HARQ-ACK is multiplexed on the LP PUSCH, the LP PUSCH dropping may also drop the multiplexed HP HARQ-ACK on it. Thus, if the HP HARQ-ACK from the first overlapping HP PUCCH is multiplexed on the LP PUSCH, for overlapping with a later HP PUCCH with HP HARQ-ACK, the LP PUSCH channel dropping timeline should be modified so that the HP HARQ-ACK multiplexed symbols on the LP PUSCH are not dropped. For example, if the multiplexing RE symbols of the first HARQ-ACK overlap with the next HP PUCCH is confined with the same subslot as the first HP PUCCH, there will be no overlapping between the multiplexed HP HARQ-ACK on LP PUSCH with a later HP PUCCH with HP HARQ-ACK.

Figure 13:
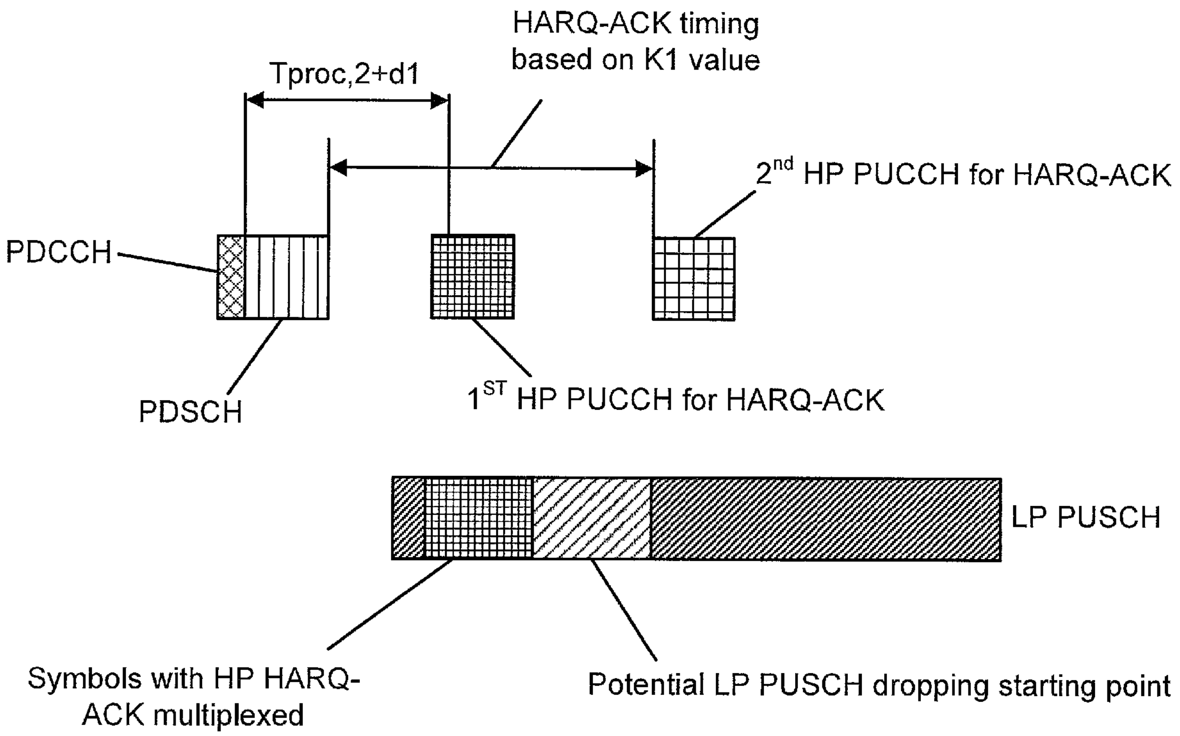
FIG. 13 is a timeline illustrating an example of another approach for collision resolution in accordance with some of the techniques described herein.

Therefore, if the multiplexing symbols of the first HARQ-ACK do not overlap with the next HP PUCCH carrying HP HARQ-ACK, the remaining HP PUCCHs with HP HARQ-ACKs are transmitted, and the LP PUSCH is cancelled no late than the starting symbol of the next HP PUCCH with HP HARQ-ACK, and no early than the symbol after the first HARQ-ACK multiplexed symbols on LP PUSCH, as shown in FIG. 13. All later HP PUCCHs with HP HARQ-ACK if any will be transmitted, and the cancelled LP PUSCH is not resumed after cancellation.

FIG. 13 is a timing diagram illustrating an enhanced LP PUSCH dropping timeline to avoid dropping of multiplexed HP HARQ-ACK.

On the other hand, if the multiplexing symbols of the first HARQ-ACK overlaps with the next HP PUCCH carrying HP HARQ-ACK, two approaches can be considered. In one approach, the later HP PUCCH with HP HARQ-ACK is dropped, and the LP PUSCH with the first HP HARQ-ACK is transmitted. The UE should perform the same evaluation if there is (are) other overlapping HP PUCCH(s) with HP HARQ-ACK. In another approach, the remaining HP PUCCHs with HP HARQ-ACKs are transmitted, and the LP PUSCH is cancelled from the starting symbol of the next HP PUCCH with HP HARQ-ACK, even if some of the symbols multiplexed with the first HP HARQ-ACK is dropped. And the cancelled LP PUSCH is not resumed after cancellation.

Benefit of Approach 2:

Same UCI multiplexing method as single PUCCH overlapping case.

New rules to avoid dropping of multiplexed HP HARQ-ACK on LP PUSCH in case of channel dropping is required by later HP PUCCH.

Approach 3: Support joint HARQ-ACK multiplexing for overlapping PUCCHs that satisfy the timeline requirements Yet in another method, the multiple HP HARQ-ACKs from overlapping HP PUCCHs may be jointly reported on a LP PUSCH. Thus, joint HP HARQ-ACK multiplexing on LP PUSCH can be performed for all overlapping PUCCHs that satisfy the UCI multiplexing timeline requirements and delay timeline restrictions.

For joint HP HARQ-ACK multiplexing, the HP HARQ-ACK bits from the overlapping HP PUCCHs that satisfy the UCI multiplexing timeline requirements are concatenated into a single HP HARQ-ACK codebook following the PUCCH ordering, i.e. the HP HARQ-ACK bits from the first overlapping HP PUCCH is put at the beginning, and HARQ-ACK bits from a later HP PUCCH are appended to the previous HARQ-ACK bits.

Whether HP HARQ-ACK multiplexing on LP PUSCH is supported is determined by the first (i.e. the earliest) overlapping HP PUCCH with HP HARQ-ACK.

(1) If the first overlapping HP PUCCH with HP HARQ-ACK cannot be multiplexed on the LP PUSCH due to timeline cannot be satisfied, channel dropping is performed. Thus, the LP PUSCH is dropped, and all overlapping HP PUCCHs with HP HARQ-ACKs are transmitted.

(2) If the first overlapping HP PUCCH with HP HARQ-ACK can be multiplexed on the LP PUSCH. HP HARQ-ACK multiplexing on PUSCH can be performed at least for the first HARQ-ACK from the first overlapping HP PUCCH.

(3) The UE then evaluate the timeline requirements for the next overlapping HP PUCCH with HP HARQ-ACK.

(4) If the next overlapping HP PUCCH with HP HARQ-ACK can be multiplexed on the LP PUSCH satisfying the timeline requirements, the next HP HARQ-ACK of the next HP PUCCH is appended to the existing HP HARQ-ACK codebook, and the joint HARQ-ACK codebook may be multiplexed on the LP PUSCH following a single HARQ-ACK codebook multiplexing procedure.

(5) If the next overlapping HP PUCCH with HP HARQ-ACK cannot be multiplexed on the LP PUSCH due to timeline requirements cannot be satisfied. The following procedures can be further evaluated.

(6) If there is (are) remaining HP PUCCH(s) not satisfying the UCI multiplexing timeline requirements, and if the multiplexing symbols of the HARQ-ACK on LP PUSCH do not overlap with the next HP PUCCH with HP HARQ-ACK that does not satisfy the timeline requirements for multiplexing, the remaining HP PUCCHs with HP HARQ-ACKs are transmitted, and the LP PUSCH is dropped no late than the starting symbol of the next HP PUCCH with HP HARQ-ACK, and no early than the symbol after the HP HARQ-ACK multiplexed symbols on LP PUSCH. All later HP PUCCHs with HP HARQ-ACK if any will be transmitted, and the cancelled LP PUSCH is not resumed after cancellation. The same principle as in FIG. 10 is applied.

(7) On the other hand, if the multiplexing symbols of the HARQ-ACK on LP PUSCH overlaps with the next HP PUCCH carrying HP HARQ-ACK, two approaches can be considered. In one approach, the later HP PUCCH with HP HARQ-ACK is dropped, and the LP PUSCH with the multiplexed HP HARQ-ACK is transmitted. The UE should perform the same evaluation if there is (are) other overlapping HP PUCCH(s) with HP HARQ-ACK. In another approach, the remaining HP PUCCHs with HP HARQ-ACKs are transmitted, and the LP PUSCH is cancelled from the starting symbol of the next HP PUCCH with HP HARQ-ACK, even if some of the symbols multiplexed with the HP HARQ-ACK is dropped. And the cancelled LP PUSCH is not resumed after cancellation.

(8) The procedures from 4)-7) continues and repeats until all overlapping HP PUCCHs with HP HARQ-ACKs are processed.

Compared with Approach 2, Approach 3 allows HP HARQ-ACKs from multiple HP PUCCH to be multiplexed on the same LP PUSCH. If channel dropping is used for HP PUCCH with HP HARQ-ACK because of UCI multiplexing timeline requirements cannot be met, the UE should use enhanced dropping timeline, i.e. the UE should cancel the transmission of the LP PUSCH no late than the starting symbol of the next HP PUCCH with HP HARQ-ACK, and no early than the symbol after the multiplexed HP HARQ-ACK symbols on LP PUSCH.

The joint reporting of multiple HP HARQ-ACKs from multiple HP PUCCHs provides simple solution with only one HP HARQ-ACK multiplexing procedure on a LP PUSCH. In some sense, the joint reporting achieves similar results as HP SPS HARQ-ACK deferral on PUCCH. If the initial HP SRS HARQ-ACK PUCCH cannot be transmitted due to SFI conflict, the SPS HARQ-ACK can be deferred to a later PUCCH transmission. The later PUCCH can include the deferred HARQ-ACK by itself. If there is another HARQ-ACK to be reported in the target subslot/slot, the deferred SPS HARQ-ACK can be reported jointly with the other HP HARQ-ACK on a HP PUCCH resource. The joint multiplexing of HP HARQ-ACKs from multiple HP PUCCHs on LP PUSCH, can be viewed as deferral of earlier PUCCHs to form a final PUCCH with joint HARQ-ACK, and the joint HARQ-ACK is then multiplexed on the LP PUSCH. Thus, for all overlapping HP PUCCHs with HP HARQ-ACK that meet the multiplexing timeline requirements, support joint reporting of HARQ-ACK from multiple HP PUCCH on a LP PUSCH is feasible and beneficial.

Figure 14:
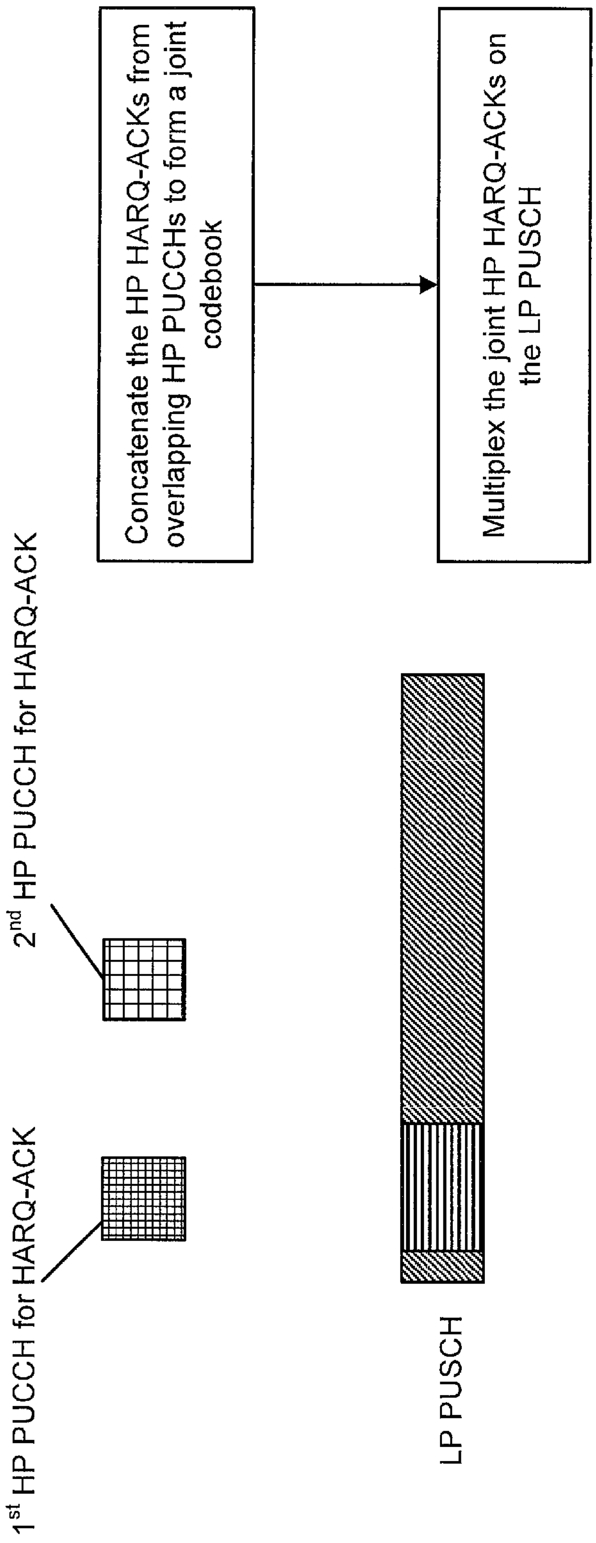
FIG. 14 is a timeline illustrating an example of another approach for collision resolution in accordance with some of the techniques described herein.

FIG. 14 is a timing diagram of joint HARQ-ACK multiplexing from multiple overlapping HP PUCCHs. If only the first overlapping HP PUCCH with HP HARQ-ACK satisfies the timeline requirements, Approach 3 becomes the same as Approach 2. If all overlapping HP PUCCHs with HP HARQ-ACKs satisfy the timeline requirements, the HP HARQ-ACKs from all overlapping HP PUCCHs are concatenated together, jointly coded, and then multiplexed on the LP PUSCH. FIG. 14 shows an example with two overlapping HP PUCCH for HARQ-ACK.

Benefit of Approach 3:

Only one HARQ-ACK multiplexing procedure is performed.

More efficient with joint coding

New rules to avoid dropping of multiplexed HP HARQ-ACK on PUSCH in case of channel dropping is required by later HP PUCCH.

Figure 15:
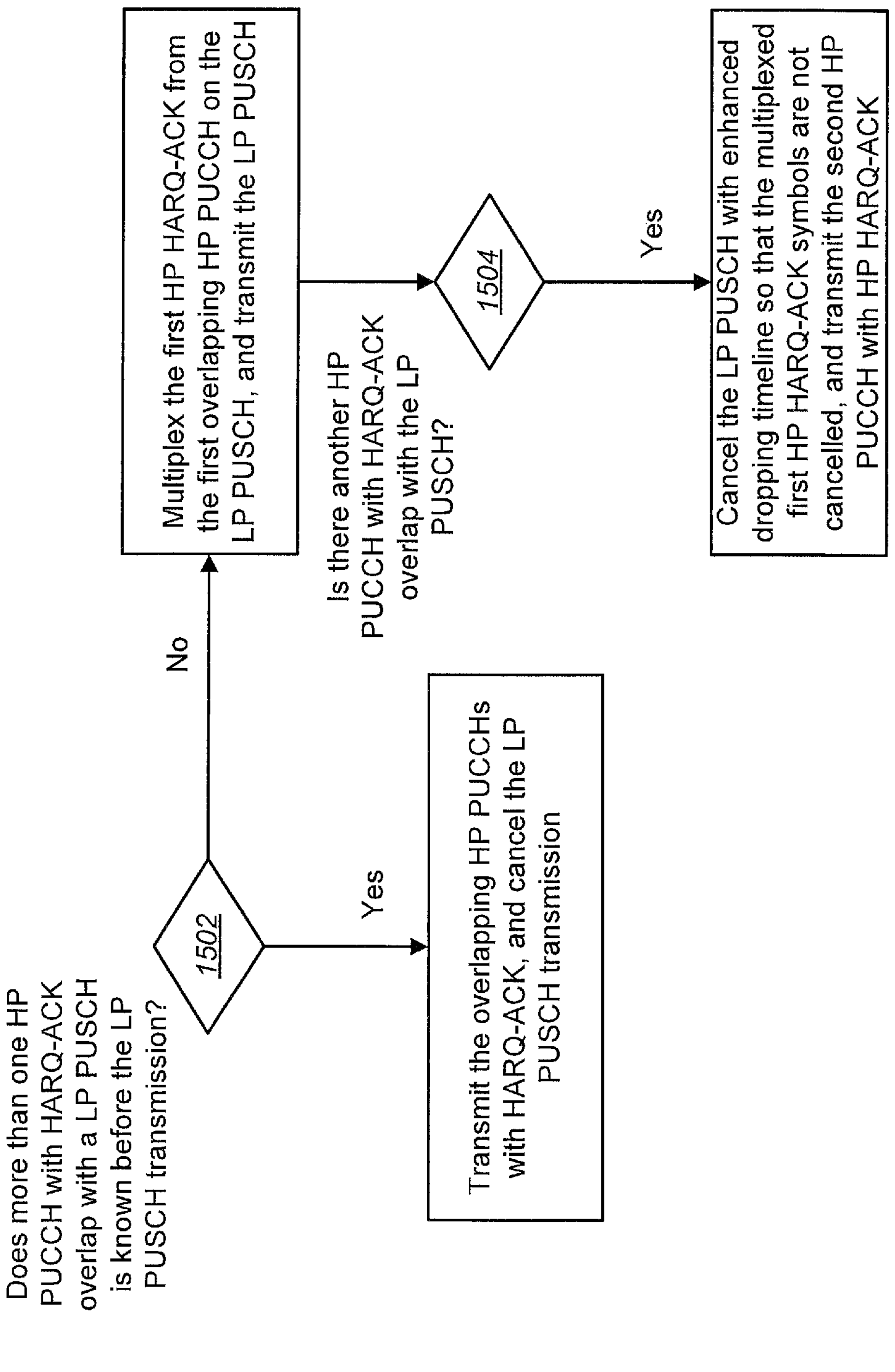
FIG. 15 is a flow diagram illustrating an example of another approach for collision resolution in accordance with some of the techniques described herein.

Approach 4: Cancel the LP PUSCH if the overlapping of two or more HP PUCCH transmissions is known before the LP PUSCH transmission Yet in another method, since the LP PUSCH dropping will be performed by later HP PUCCH with HP HARQ-ACK anyway. The HP HARQ-ACK multiplexing may not be performed for any HP HARQ-ACK from any HP PUCCH under some timing conditions. FIG. 15 shows the flow chart procedures of this method.

At 1502, if the UE knows that there are more than one HP PUCCH transmissions carrying HP HARQ-ACK that will overlap a LP PUSCH before the LP PUSCH transmission, the HP HARQ-ACK multiplexing on LP PUSCH is not performed at 1504.

The dropping timeline should be enhanced to make sure the UE knows more than one HP PUCCHs with HARQ-ACK overlap with the LP PUSCH. Thus, the UE should cancel the LP PUSCH transmission no later than the first symbol of the first overlapping HP PUCCH carrying HP HARQ-ACK, and no earlier than the Proc,2+d1 after the DCI of a PDSCH transmission in the 2nd overlapping HP PUCCH with HP HARQ-ACK.

If the UE does not know that there are more than one HP PUCCH transmissions carrying HP HARQ-ACK overlap the LP PUSCH before the LP PUSCH transmission starts, the UE may already multiplex 1506 the HP HARQ-ACK from the first overlapping HP PUCCH on the LP PUSCH. The UE should perform channel dropping as in Approach 2.

The dropping timeline should also be enhanced, so that the UE cancels 1508 the LP PUSCH transmission no later than the first symbol of the first overlapping HP PUCCH carrying HP HARQ-ACK, and no earlier than the Proc,2+d1 after the DCI of a PDSCH transmission in the 2nd overlapping HP PUCCH with HP HARQ-ACK, and no earlier than the symbol after the last HP HARQ-ACK multiplexed symbol on the LP PUSCH.

FIG. 15 is a flow diagram of LP PUSCH dropping procedures for overlapping with more than one HP PUCCH with HARQ-ACK Benefit of Approach 4:

Simple solution to drop LP PUSCH under some timeline conditions

Avoid UCI multiplexing on PUSCH

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a micro-controller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

CROSS REFERENCE

This Nonprovisional application claims priority under 35 U.S.C. § 119 on provisional Application No. 63/275,830 on Nov. 4, 2021, the entire contents of which are hereby incorporated by reference.

What is claimed is:

1. A user equipment (UE), comprising:

circuitry configured to:

determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP);

when overlapping with only one HP PUCCH with HP HARQ-ACK is known before an LP PUSCH transmission, multiplex a first HP HARQ-ACK from a first overlapping HP PUCCH on the LP PUSCH and transmit later overlapping HP PUCCH(s) carrying the HP HARQ-ACK by partially dropping the LP PUSCH with the first HP HARQ-ACK perform channel dropping for later overlapping HP PUCCH with HP HARQ-ACK; and when overlapping with more than one HP PUCCH with HP HARQ-ACK is known before an LP PUSCH transmission, cancel the LP PUSCH and transmit HP PUCCHs with HP HARQ-ACKs.

2. A base station (gNB), comprising:

circuitry configured to:

determine that a physical uplink control channel (PUCCH) with high priority (HP) carrying HP hybrid automatic repeat request-acknowledgements (HARQ-ACKs) overlaps with a physical uplink shared channel (PUSCH) with low priority (LP);

receive the LP PUSCH, when overlapping with only one HP PUCCH with HP HARQ-ACK is known before an LP PUSCH transmission, a first HP HARQ-ACK from a first overlapping HP PUCCH is multiplexed on the LP PUSCH for later overlapping HP PUCCH with HP HARQ-ACK, and transmit later overlapping HP PUCCH(s) carrying the HP HARQ-ACK by partially dropping the LP PUSCH with the first HP HARQ-ACK, and receive HP PUCCHs with HP HARQ-ACKs with the LP PUSCH canceled when overlapping with more than one HP PUCCH with HP HARQ-ACK is known before an LP PUSCH transmission.

* * * * *